United States Patent [19]

Washburn et al.

[11] Patent Number: 4,841,428

[45] Date of Patent: Jun. 20, 1989

[54] NON-SATURATING MAGNETIC AMPLIFIER CONTROLLER

[75] Inventors: Robert D. Washburn, Malibu; Robert F. McClanahan, Valencia, both of Calif.

[73] Assignee: Hughes Aircraft Company, Los Angeles, Calif.

[21] Appl. No.: 169,921

[22] Filed: Mar. 18, 1988

[51] Int. Cl.[4] .............................................. H02P 13/04

[52] U.S. Cl. ...................................... 363/75; 323/331; 323/334; 323/362

[58] Field of Search .................. 363/75, 82, 90, 14 91, 363/93; 323/250, 308, 328, 331, 334, 362; 336/155, 165, 170, 178, 212, 214, 215

[56] References Cited

U.S. PATENT DOCUMENTS

| | | | |
|---|---|---|---|
| 2,738,458 | 3/1956 | Walsh | 336/155 |
| 3,546,571 | 12/1970 | Fletcher et al. | 336/178 |
| 3,584,290 | 6/1971 | Spreadbury | 323/308 |
| 3,708,744 | 1/1973 | Stephens et al. | 336/155 |
| 4,213,084 | 7/1980 | Hiromitsu | 363/91 |

OTHER PUBLICATIONS

A. S. Kisslovski, "Quasi—Linear Controllable Inductor", Proceedings of the IEEE, vol. 75, No. 2, Feb. 1987, pp. 267–269.

*Primary Examiner*—Peter S. Wong
*Attorney, Agent, or Firm*—Leonard A. Alkov; A. W. Karambelas

[57] ABSTRACT

A magnetic amplifier including a magnetic core having a primary leg, a secondary leg, and a control leg. A primary winding is wound about the primary leg of the magnetic core for generating a non-saturating magnetic AC flux in the magnetic core, and a secondary winding is wound about the secondary leg of the magnetic core. A control winding for conducting DC current is wound about the control leg of the magnetic core for controlling as a function of the DC current, without saturating the magnetic core, the reluctance of the control leg relative to the reluctance of the secondary leg. By controlling the relative reluctance, the amount of magnetic AC flux coupled to the secondary winding is controlled, thereby relative reluctance, the amount of magnetic AC flux econtrolling the output voltage provided by the secondary winding.

14 Claims, 2 Drawing Sheets

NON-SATURATING MAGNETIC AMPLIFIER CONTROLLER

BACKGROUND OF THE INVENTION

The disclosed invention generally relates to AC voltage regulation circuitry, and is more particularly directed to a non-saturating magnetic amplifier for regulating an AC voltage.

Known circuitry for regulating an AC voltage include switching regulators which include active devices (e.g., transistors) as well as passive devices. Switching regulators in essence switch power on and off to control the relationship of the on time to the off time so as to achieve the desired average output voltage.

An important consideration with switching regulators is the noise that is generated by the switching. Another consideration with switching regulators is the sensitivity of active devices to hostile environments, such as radiation, which often results in failure.

Further known circuitry for regulating an AC voltage include magnetic amplifiers which have a control winding in addition to the primary and secondary windings. Such magnetic amplifiers are similar to switching regulators in that they switch power on and off, but without active devices and therefore without the sensitivities of active devices.

However, known magnetic amplifiers utilize the saturation characteristics of transformers, which results in noise and loss. Such loss increases with frequency and becomes quite significant at frequencies as low as 1000 Hz.

SUMMARY OF THE INVENTION

It would therefore be an advantage to provide a magnetic amplifier voltage regulator which does not utilize switching.

Another advantage would be to provide a magnetic amplifier voltage regulator which does not operate in the saturation region.

A further advantage would be to provide a magnetic amplifier voltage regulator which provides for reduced noise and loss.

The foregoing and other advantages and features are provided by a magnetic amplifier which includes a magnetic core having a primary leg, a secondary leg, and a control leg. A primary winding is wound about the primary leg of the magnetic core for generating a non-saturating magnetic AC flux in the magnetic core, and a secondary winding is wound about the secondary leg of the magnetic core. A control winding for conducting DC current is wound about the control leg of the magnetic core for controlling as a function of DC current, without saturating the magnetic core, the reluctance of the control leg relative to the reluctance of the secondary leg. By controlling the relative reluctance, the amount of magnetic AC flux coupled to the secondary winding is controlled, thereby controlling the output voltage provided by the secondary winding.

BRIEF DESCRIPTION OF THE DRAWING

The advantages and features of the disclosed invention will readily be appreciated by persons skilled in the art from the following detailed description when read in conjunction with the drawing wherein.

DETAILED DESCRIPTION

Figure 1:
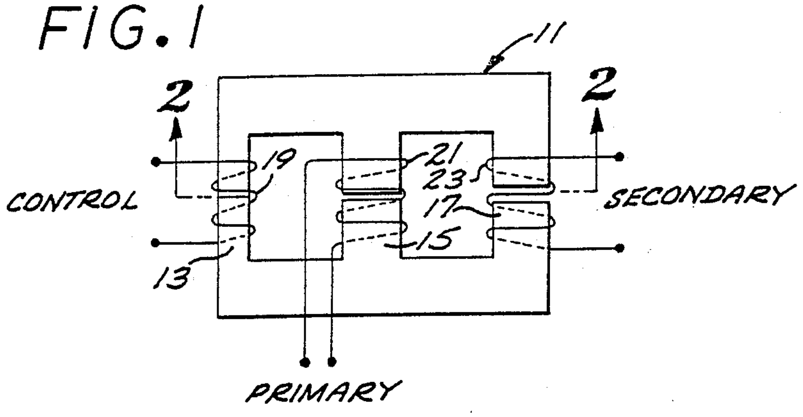
FIG. 1 is a schematic diagram of a magnetic amplifier having one control leg.

In the following detailed description and in the several figures of the drawing, like elements are identified with like reference numerals.

Figure 2:
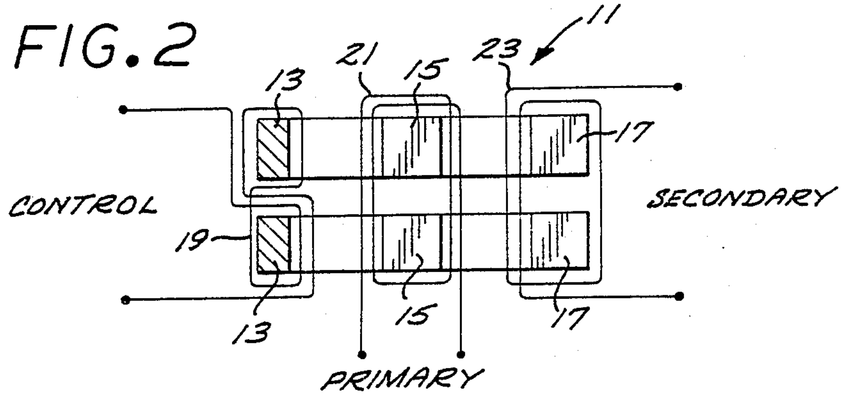
FIG. 2 is a sectional schematic diagram of the magnetic amplifier of FIG. 1.

Referring now to FIGS. 1 and 2, illustrated therein is a magnetic amplifier 10 which includes the first and second parallel core elements 11A, 11B of a ferromagnetic core 11, which includes three legs 13, 15, 17 that are associated with particular windings. It should be appreciated that each leg actually comprises parallel portions of the parallel core elements 11A, 11B.

The core leg 13 is a control leg and does not include a gap as shown. A control winding 19 is wound around the control leg 13, and as shown in FIG. 2, the control winding 19 is particularly counter wound around the core elements comprising the control leg 13 so as to reduce or substantially cancel the AC voltage on the control winding 19.

The centrally located leg 15 is the primary leg, which may include a small air gap, as shown. A primary winding 21 is wound around the primary leg 15.

The cross section of the primary leg 15 must be sufficiently larger than the cross section of the control leg 13 so that as the control leg 13 approaches saturation, it does not significantly affect the permeability of the primary leg 15. For example, the cross-sectional area of the control leg 13 should be less than one-half of the cross sectional area of the primary leg 15. It should be noted that although the control leg 13 approaches saturation, whereby its reluctance increases, it is not operated in the saturation region.

The outside leg 17 is a secondary leg, and includes an air gap. A secondary winding 23 is wound around the secondary leg 17. The air gap in the secondary leg 17 is larger than the optional air gap in the primary leg 15, so that the reluctance in the secondary leg 17 is greater than the reluctance in the primary leg 15 and also greater than the reluctance in the control leg 13.

The relationship between the voltages on the primary and secondary windings is controlled by the selective application of a variable DC current to the control winding 19. In the absence of a DC control current, most of the magnetic AC flux produced by a voltage across the primary winding 21 (i.e., the voltage to be regulated) will be coupled into the control winding since the control leg 13 provides a lower reluctance path than the gapped secondary leg 17. Therefore, little voltage will be developed across the secondary winding 23.

As the DC current in the control winding 19 is increased, the control winding leg becomes increasingly saturated by the DC flux (but does not saturate), thus increasing its magnetic reluctance. As the reluctance of the control leg 13 increases with increasing DC current, less magnetic AC flux is shunted into the control winding and more magnetic AC flux is coupled into the secondary winding 23. The increase in magnetic AC flux in the secondary winding 23 results in an increased secondary voltage output.

The magnetic amplifier 10 is operated without driving the core 11 into saturation and, preferably, on a linear portion of the B-H curve associated with the core 11. Operation on a linear portion of the B-H curve provides for a linear relation between the DC control current (applied to the control winding 19) and the AC output voltage across the secondary winding 23.

Figure 3:
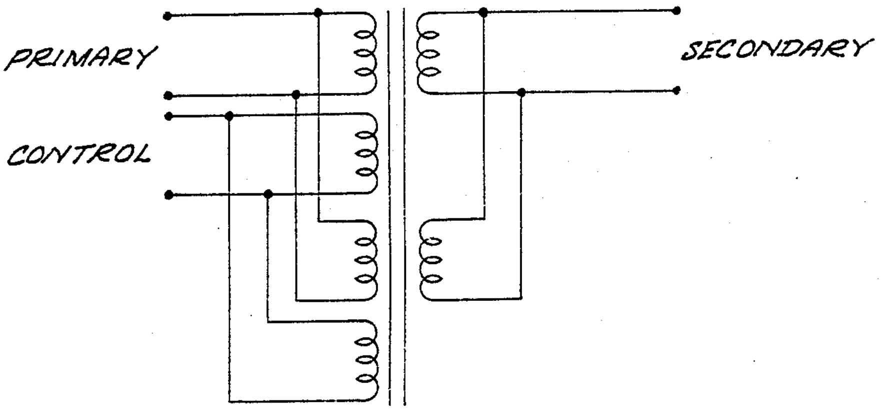
FIG 3 is a circuit schematic of the magnetic amplifier of FIGS. 1 and 2.

The magnetic amplifier 10 of FIGS. 1 and 2 is shown in circuit schematic form in FIG. 3.

Figure 4:
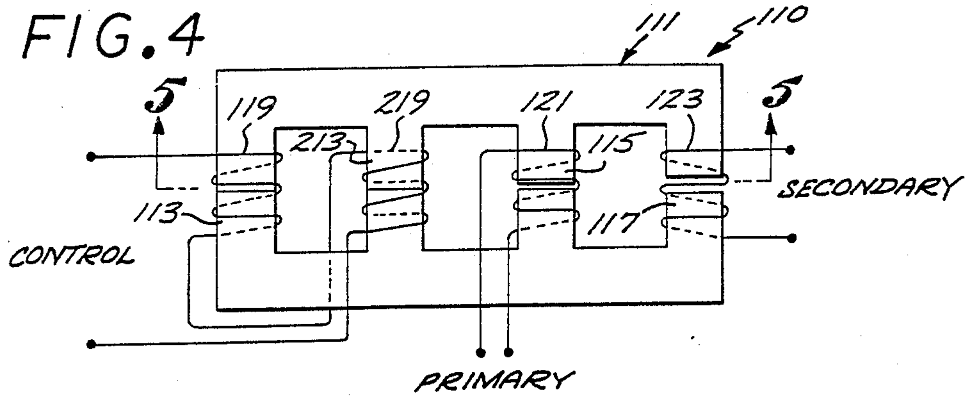
FIG. 4 is a schematic diagram of a magnetic amplifier having two control legs.
Figure 5:
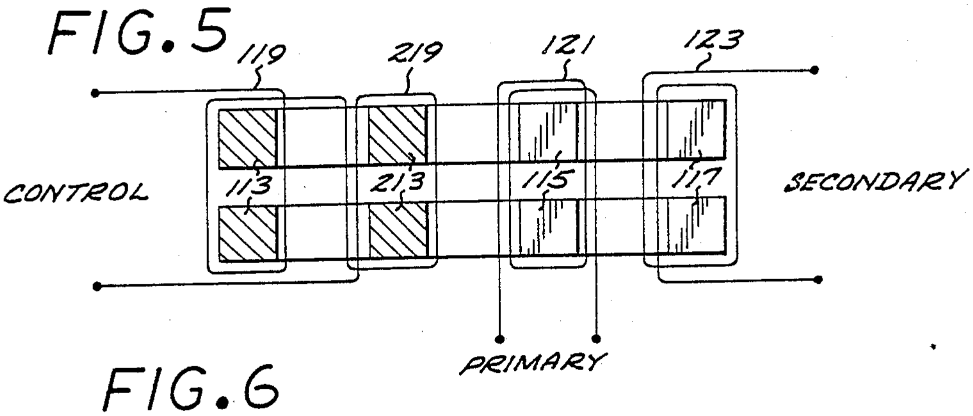
FIG. 5 is a sectional schematic diagram of the magnetic amplifier of FIG. 3.

Referring to FIGS. 4 and 5, shown therein is a magnetic amplifier 110 which includes first and second parallel core elements 111A, 111B of a ferromagnetic core 111. The ferromagnetic core 111 includes four legs 213, 113, 115, 117, with associated windings. It should be appreciated that each leg comprises parallel portions of the core elements 111A, 111B.

The legs 113, 213 comprise control legs which have no air gaps. Serially connected control windings 119, 219 are respectively counterwound around the control legs 113, 213. Such counter winding tends to reduce or cancel the AC voltage on the control windings 113, 213.

The magnetic core leg 115 is the primary leg, which may have small air gap, as shown. A primary winding 121 is wound around the primary leg 115.

The magnetic core leg 117 is the secondary leg, which has an air gap that is larger than the air gap of the primary leg 115. As a result of the greater air gap, the secondary leg 117 has a greater reluctance than the other legs of the amplifier. A secondary winding 123 is wound around the secondary leg 117.

With two control legs 113, 213, the cross-sectional area of the legs of the magnetic amplifier 110 can all be the same. The magnetic DC flux is contained for the most part in the ungapped control legs 113, 213, whereby the primary leg 115 and the secondary leg 117 are subject to insignificant magnetic DC flux. This results in considerably less parameter variation over the operating range, in comparison to the three-legged magnetic amplifier 10 of FIGS. 1-3.

The magnetic amplifier 110 is operated without driving the core 111 into saturation, and preferably on a linear portion of the B-H curve associated with the core 111. Such operation on a linear portion of the B-H curve provides for a linear relation between the DC control current (applied to the control windings 119, 219) and the AC output voltage across the secondary winding 123.

Figure 6:
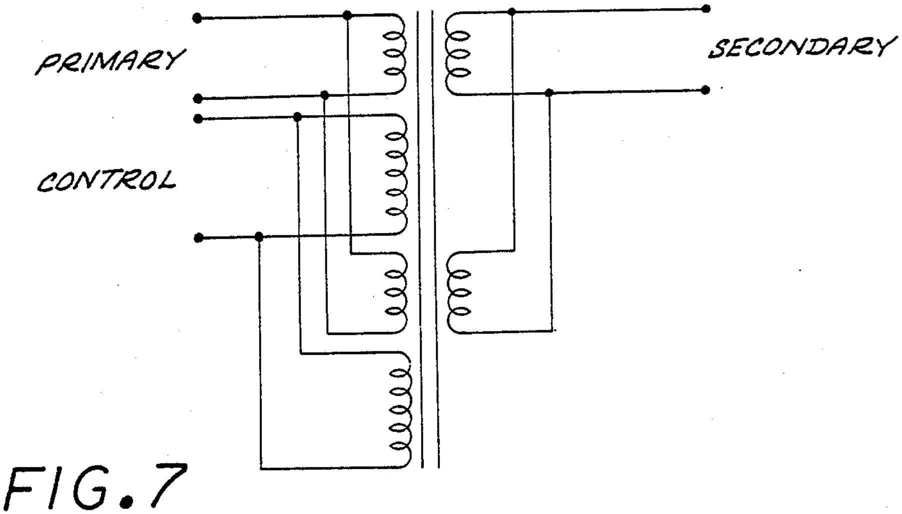
FIG. 6 is a circuit schematic of the magnetic amplifier of FIGS. 4 and 5.

The magnetic amplifier of FIGS. 4 and 5 is shown in circuit schematic form in FIG. 6.

Figure 7:
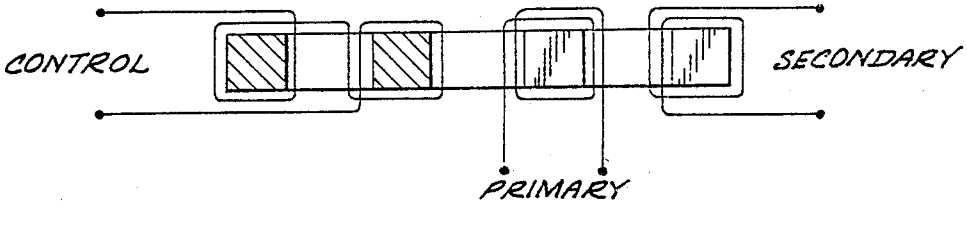
FIG. 7 is a sectional view of a magnetic amplifier having a single element magnetic core and two control legs.

The foregoing four-legged magnetic amplifier can also be implemented with only a single core element (i.e., without one of the parallel core elements), in which case the control windings are serially connected and counterwound around the control legs as shown in FIG. 7.

In the foregoing magnetic amplifier circuitry, a non-saturating magnetic DC flux level is utilized so that the control winding modulates the reluctance of the control leg(s) relative to the reluctance of the secondary leg of the transformer, thereby permitting magnetic AC flux redirection.

The foregoing has been a disclosure of a magnetic amplifier structure which provides for AC voltage regulation without switching and its associated detrimental characteristics, and provides advantages including the following. AC voltage regulation is provided in a linear low-loss, non-switching mode which provides very high efficiency with little noise generation. Further, since the magnetic amplifier structure does not utilize active devices, it is of reduced complexity, lower cost, and more reliable than switching regulators.

Although the foregoing has been a description and illustration of specific embodiments of the invention, various modifications and changes thereto can be made by persons skilled in the art without departing from the scope and spirit of the invention as defined by the following claims.

What is claimed is:

1. A magnetic amplifier comprising:

a magnetic core having a primary leg, a secondary leg, and a control leg;

a primary winding disposed about said primary leg of said magnetic core for generating a magnetic AC flux in said magnetic core;

a secondary winding disposed about said secondary leg of said magnetic core; and a control winding disposed about said control leg of said magnetic core for controlling the reluctance of said control leg relative to the reluctance of said secondary leg, said control being provided without driving said magnetic core into saturation.

2. The magnetic amplifier of claim 1 wherein said control winding provides control in response to a DC current.

3. The magnetic amplifier of claim 2 wherein said control leg has a cross-sectional area that is less than one-half the cross-sectional area of said primary leg.

4. The magnetic amplifier of claim 3 wherein said control leg does not have an air gap.

5. The magnetic amplifier of claim 4 wherein said secondary leg includes an air gap.

6. The magnetic amplifier of claim 5 wherein said primary leg includes an air gap that is smaller than the air gap of said secondary leg.

7. The magnetic amplifier of claim 3 wherein said magnetic core includes first and second parallel magnetic elements, wherein each leg comprises first and second corresponding portions of said magnetic elements.

8. The magnetic amplifier of claim 7 wherein said control winding is counter wound about the parallel portions of said control leg.

9. The magnetic amplifier of claim 2 wherein said magnetic core includes a second control leg, and further including a second control winding serially connected to said control winding.

10. The magnetic amplifier of claim 9 wherein said control winding and said second control winding are wound in opposite directions.

11. The magnetic amplifier of claim 10 wherein said control leg, said second control leg, and said primary leg have substantially the same cross sectional areas.

12. The magnetic amplifier of claim 11 wherein said control leg and second control leg do not have air gaps.

13. The magnetic amplifier of claim 12 wherein said secondary leg includes an air gap.

14. The magnetic amplifier of claim 13 wherein said primary leg includes an air gap that is smaller than the air gap of said secondary leg.

* * * * *